United States Patent
Zhu

(10) Patent No.: US 7,697,075 B2
(45) Date of Patent: Apr. 13, 2010

(54) COLOR-CROSSING ERROR SUPPRESSION SYSTEM AND METHOD FOR DECODED COMPOSITE VIDEO SIGNALS

(75) Inventor: Ge Zhu, Shanghai (CN)

(73) Assignee: Huaya Microelectronics, Ltd., San Jose, CA (US)

( * ) Notice: Subject to any disclaimer, the term of this patent is extended or adjusted under 35 U.S.C. 154(b) by 1275 days.

(21) Appl. No.: 11/046,591

(22) Filed: Jan. 28, 2005

(65) Prior Publication Data

US 2006/0092332 A1   May 4, 2006

(30) Foreign Application Priority Data

Oct. 29, 2004   (CN) .................. 2004 1 0067644

(51) Int. Cl.
*H04N 9/64*   (2006.01)
*H04N 9/77*   (2006.01)

(52) U.S. Cl. .................. 348/609; 348/624; 348/666; 348/701

(58) Field of Classification Search .............. 348/624, 348/665–666, 609, 700–701, 713, 621, 699, 348/451–452; 382/167; *H04N 9/64, 9/77*
See application file for complete search history.

(56) References Cited

U.S. PATENT DOCUMENTS

| | | | | |
|---|---|---|---|---|
| 5,305,120 | A   * | 4/1994  | Faroudja ................. | 348/624 |
| 7,271,850 | B2 * | 9/2007  | Chao ..................... | 348/609 |
| 7,280,159 | B2 * | 10/2007 | Chao ..................... | 348/609 |
| 2005/0168650 | A1* | 8/2005 | Walls et al. ............ | 348/666 |

* cited by examiner

*Primary Examiner*—Trang U Tran
(74) *Attorney, Agent, or Firm*—Silicon Valley Patent Group, LLP; Edward Mao

(57) ABSTRACT

A method and system for suppressing color-crossing error in decoded video signals is presented. The color-crossing error suppression method and system uses a first suppression technique at a pixel location for a first subset of fields exhibiting color-crossing error at a pixel location then uses a second suppression technique at the pixel location for a second subset of fields exhibiting color-crossing error at the pixel location. The second subset of fields follows the first subset of fields in the video signals.

22 Claims, 10 Drawing Sheets

COLOR-CROSSING ERROR SUPPRESSION SYSTEM AND METHOD FOR DECODED COMPOSITE VIDEO SIGNALS

BACKGROUND OF THE INVENTION

1. Field of the Invention

The present invention relates to digital image and video processing. More specifically, the present invention relates to methods of detecting and suppressing color-crossing errors for decoded video signals.

2. Discussion of Related Art

Due to advancing semiconductor processing technology, integrated circuits (ICs) have greatly increased in functionality and complexity. With increasing processing and memory capabilities, many formerly analog tasks are being performed digitally. For example, images, audio and even full motion video can now be produced, distributed, and used in digital formats.

FIG. 1 is an illustrative diagram of a portion of interlaced digital video signal 100 most often used in television systems. Interlaced digital video signal 100 comprises a series of individual fields F(0) to F(N). Even fields contain even numbered rows while odd fields contain odd numbered rows. For example if a frame has 400 rows of 640 pixels, the even field would contains rows 2, 4, ... 400 and the odd field would contains rows 1, 3, 5, ... 399 of the frame. In general for an interlaced video signal each field is formed at a different time. For example, an interlaced video capture device (e.g. a video camera) captures and stores the odd scan lines of a scene at time T as field F(5), then the video capture device stores the even scan lines of a scene at time T+1 as field F(6). The process continues for each field. Two main interlaced video standards are used. The PAL (Phase Alternating Line) standard, which is used in Europe, displays 50 fields per seconds and the NTSC (National Television System Committee) standard, which is used in the United States, displays 60 fields per seconds. Interlaced video systems were designed when bandwidth limitations precluded progressive (i.e., non-interlaced) video systems with adequate frame rates. Specifically, interlacing two 25 fps fields achieved an effective 50 frame per second frame rate because the phosphors used in television sets would remain "lit" while the second field is drawn.

To ease transmission of video signals, chrominance information and luminance information are combined via modulation into a single composite video signal. Imperfect decoding of composite video signals in either PAL or NTSC format may lead to color-crossing. Specifically, color-crossing error often appears in a video image where the local luminance spatial frequency is near the sub-carrier frequency of the chrominance information. Color-crossing errors occur in both PAL and NTSC video signals.

For example, NTSC video signals typically have a chrominance sub-carrier frequency of 3.58 MHz, i.e., chrominance information is modulated by a sinusoid signal with a frequency equal to 3.58 MHz before transmission. Luminance information may also have components that overlap with the chrominance information near the chrominance sub-carrier frequency. Thus the luminance components near the chrominance sub-carrier frequency cause color-crossing errors, which cannot be cleanly removed. Generally during video decoding a band pass filter at the chrominance sub-carrier frequency is used to obtain the chrominance information. However, the luminance components, which are near the chrominance sub-carrier frequency, are not blocked by the band pass filter. Therefore, the decoded chrominance signal would include "unclean" chrominance information. The color-crossing errors produce rainbow like color blinking in the decoded video image. In PAL video signals, the same color-crossing errors also occur at the PAL chrominance sub-carrier frequency of 4.43 MHz. Color-crossing error can also occur in other encoded video signals.

Conventionally, 3D comb filters have been used to reduce color-crossing errors. Specifically, in NTSC composite video signals the chrominance of corresponding pixels in two consecutive fields of the same type (odd or even) have a phase difference equal to 180 degrees. A 3D comb filter can cancel the miss-included luminance components by a simple subtraction of the video signal values of the two corresponding pixels, when the video image is not changing. However, for PAL composite video, the chrominance of corresponding pixels in two consecutive fields of the same type have only a 90 degree phase difference. Thus, to use 3D comb filters to correct color-crossing errors in decoded PAL composite video signals, four fields must be used.

While 3D comb filters can reduce color-crossing errors, 3D comb filters may also degrade other aspects of video quality. For example, 3D comb filters are very sensitive to noise in composite video signals; therefore, a digital video decoder with a 3D comb filter would have difficulties with weak video signals, which are common in many areas. Furthermore, high quality 3D comb filters are very expensive relative to other components of a video system. Hence, there is a need for a method or system that can efficiently reduce color-crossing errors from decoded composite video signals.

SUMMARY

Accordingly, the present invention provides a method and system for detecting and suppressing color-crossing errors in decoded composite video signals. Specifically, in one embodiment of the present invention, a color-crossing error detection system receives a decoded video signal having a plurality of fields. The color-crossing error detection system detects color-crossing pattern in a set of corresponding pixels that share a pixel location. Each pixel in the set of corresponding pixels comes from a different field of a set of fields. The set of fields includes a current field, which includes a current pixel at the pixel location of the set of corresponding pixels. The color-crossing error detection system determines that a color-crossing error exists at the current pixel when the color-crossing pattern exists for a number of sequential fields of the same field type at the pixel location of the current pixel. A user configurable color-crossing threshold determines the number of sequential fields for detecting color-crossing error. For PAL video signals, the color-crossing pattern is a repeating pattern of two large chrominance values followed by two small chrominance values. For NTSC video signals, the color-crossing pattern is an alternating pattern of a large chrominance value and a small chrominance value.

For color-crossing error suppression in a decoded video signals, representing a plurality of fields, the present invention provides a novel two-technique method and system. Thus, in most embodiments of the present invention, a first suppression technique is used at the pixel for a first subset of fields that exhibit color-crossing error at the pixel location. Then a second suppression technique is used at the pixel location for a second subset of fields, that exhibit color-crossing error at the pixel location. The second subset of fields follows the first subset of fields in the video signals. For example, in one embodiment of the present invention, the first suppression technique is an averaging technique and the second suppression technique is an iterative technique. In another embodiment of the present invention the first suppression technique is an iterative technique using a large weighting factor and the second suppression technique is an iterative technique using a small weighting factor.

The present invention will be more fully understood in view of the following description and drawings.

DETAILED DESCRIPTION

Figure 1:
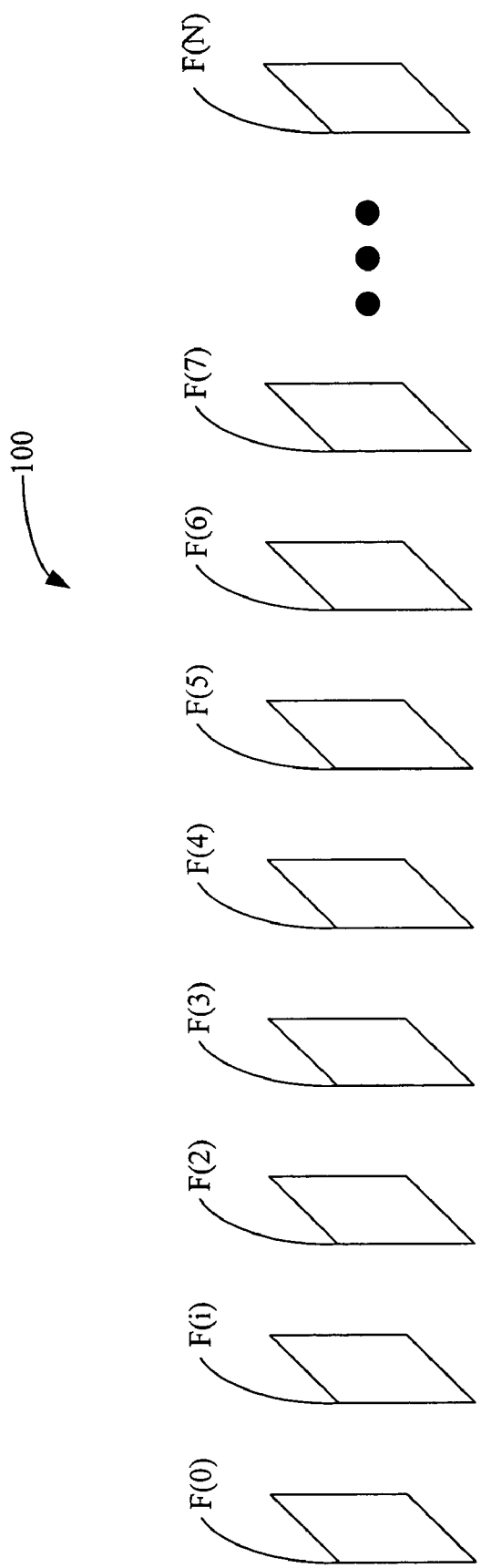
FIG. 1 is an illustration of an interlaced video signal.
Figure 2:
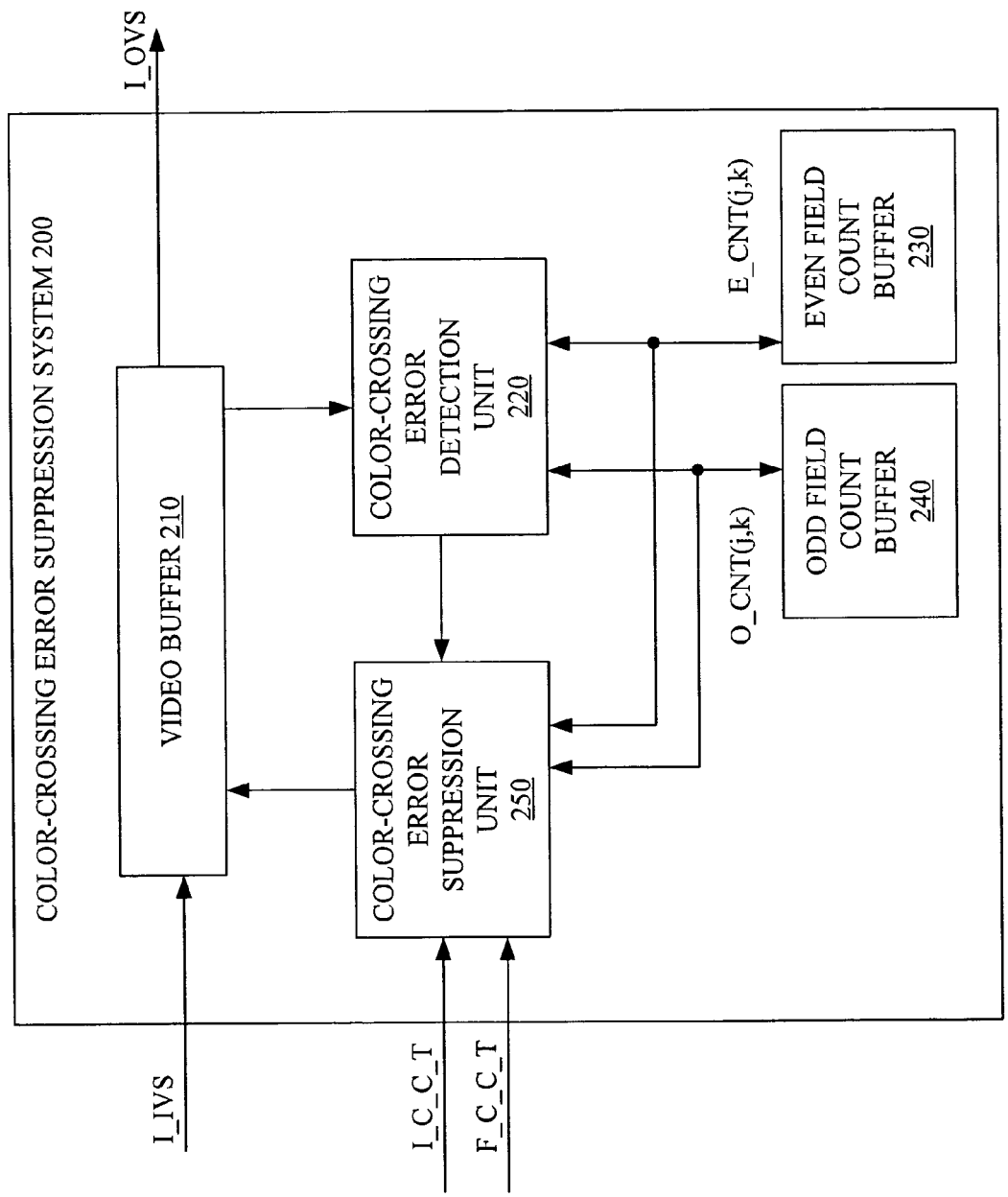
FIG. 2 is a simplified block diagram of a color-crossing error suppression system in accordance with one embodiment of the present invention.

As explained above, imperfect decoding of composite video signals may cause color-crossing errors. The present invention detects and suppresses the color crossing errors in decoded composite video signals. FIG. 2 is a block diagram of a color-crossing error suppression system 200 in accordance with one embodiment of the present invention. Color-crossing error suppression system 200 includes a video buffer 210, a color-crossing error detection unit 220, an even field count buffer 230, an odd-field count buffer 240, and a color-crossing error suppression unit 250. Video buffer 210 includes multiple field buffers that store the most recent N fields from an incoming decoded interlaced video signal I_IVS. Color-crossing error detection unit 220 reads pixel information from the fields in video buffer 210 to detect color-crossing errors using odd field count buffer 240 and even field count buffer 230 as described below. Based on the detection from color-crossing error detection unit 220, an initial color-crossing threshold I_C_C_T, and a final color crossing threshold F_C_C_T, color-crossing error suppression unit 250 writes corrected chrominance information back into video buffer 210 as described below. The corrected fields are provided as outgoing interlaced video signal O_IVS.

For conciseness and clarity, color-crossing error detection and suppression on odd fields and even fields are not separately described because color-crossing error detection and suppression on even fields are virtually identical with operation on odd fields. Specifically, operation of color-crossing error detection unit 220 and color-crossing error suppression unit 250 units are described operating on even fields using even field count buffer 230. One skilled in the art can easily apply the teachings described below for both odd fields and even fields (using odd field count buffer 240).

In some embodiments of color-crossing error suppression system 200, a still pixel detection unit (not shown) is included. In these embodiments, if the current pixel is not a still pixel, color-crossing error detection and suppression is not performed. However, the techniques and systems described below are unlikely to detect color-crossing error in non-still pixels therefore the still pixel detection unit is omitted in many embodiments of the present invention. Even for those embodiments that include a still pixel detection unit, any type of still pixel detection can be used. For example, the still pixel detection unit disclosed in U.S. patent application Ser. No. 10/659,038-3279, filed Sep. 9, 2003, entitled "Still Pixel Detection Using Multiple Windows and Thresholds" by Zhu et al., can be used for still pixel detection. However, the specifics of still pixel detection are not an integral part of the present invention.

Figure 3:
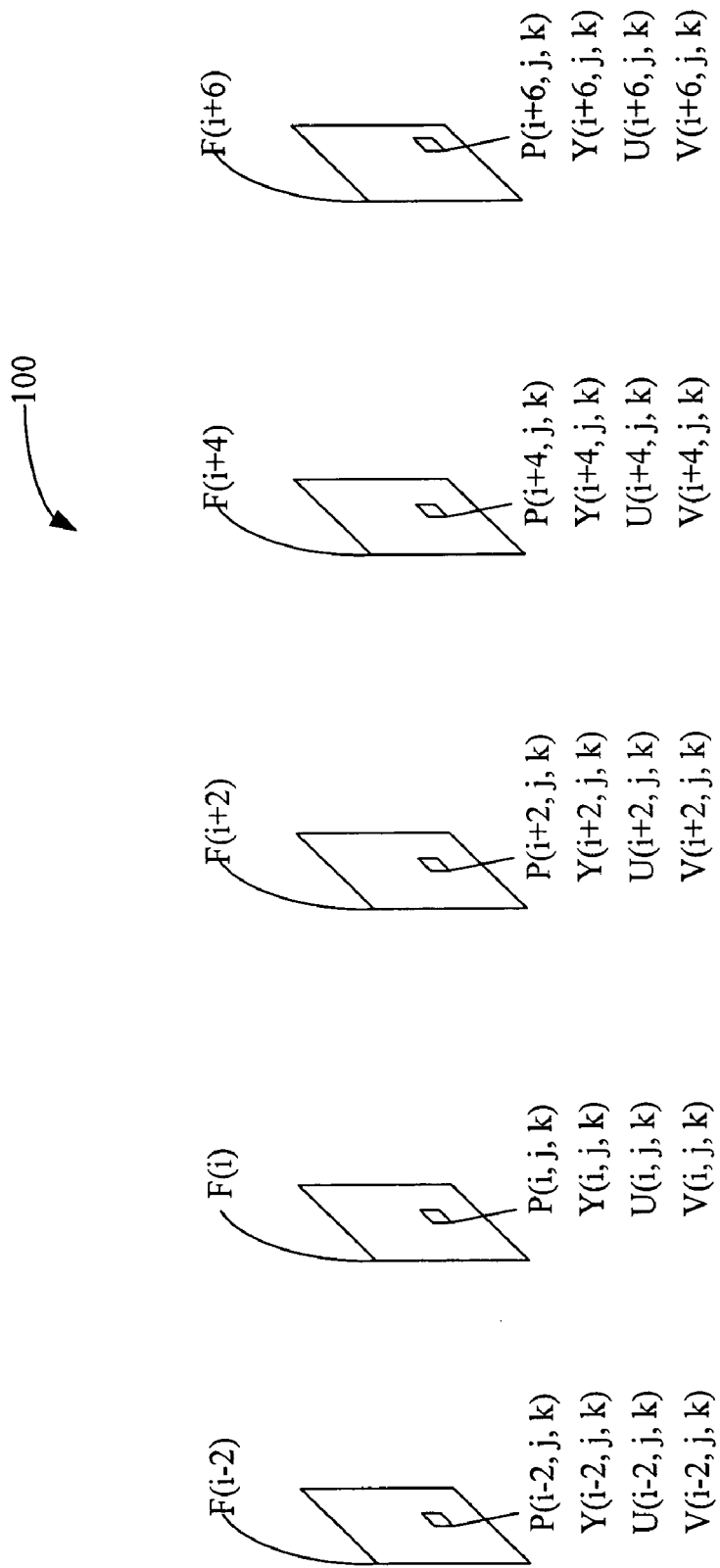
FIG. 3 illustrates the naming convention used herein.

FIG. 3 illustrates the nomenclature used herein to describe the principles used in color-crossing error suppression system 200. Specifically, FIG. 3 shows a current field F(i), a preceding field F(i−2) of the same field type, and three successive fields of the same type F(i+2), F(i+4) and F(i+6). When variable i is an odd integer, current field F(i) and fields F(i−2), F(i+2), F(i+4), and F(i+6) are odd fields, i.e. contains odd scanlines. Conversely, when variable i is an even integer, current field F(i) and fields F(i−2), F(i+2), F(i+4), and F(i+6) are even fields, i.e. contains even scan lines. FIG. 3 also shows a current pixel P(i, j, k) in current field F(i), and corresponding pixels P(i−2, j, k), P(i+2, j, k), P(i+4, j, k), and P(i+6, j, k) in fields F(i−2), F(i+2), F(i+4), and F(i+6), respectively. Corresponding pixels are located in the same pixel location within different fields. Specifically, current pixel P(i, j, k) is located at the kth pixel location on the jth scanline of field F(i). Similarly, pixel P(i+2, j, k) is located at the kth pixel location on the jth scanline of field F(i+2). In the embodiments described herein, pixels are represented in YUV format (luminance, U chrominance, V chrominance). However, other embodiments of the present invention can use other video chrominance formats such as IQ. As shown in FIG. 3, current pixel P(i, j, k) is represented with luminance Y(i, j, k), U chrominance U(i, j, k) and V(i, j, k). Similarly, the other pixels in FIG. 3 are also represented using luminance (Y), U chrominance (U), and V chrominance (V).

Color-crossing error suppression system 200 suppresses color-crossing errors based on the chrominance values of pixels at a particular pixel location (i.e., corresponding pixels) through a selected number of fields. Specifically, color-crossing error detection unit 220 analyzes a current set of pixels including current pixel p(i, j, k) from a current field F(i) and a number of corresponding pixels from following fields of the same type to determine whether the current set of pixels exhibit a color-crossing pattern. As explained in more detail below, the "color-crossing pattern" may include a time variant component. Thus, color-crossing error detection unit 220 may include additional memories to track the time variance for each pixel location. When the color-crossing pattern is detected the corresponding count value E_CNT(j, k) in even field count buffer 230 is incremented. If the color-crossing pattern is not detected, count value E_CNT(j, k) is reset to zero. As explained above, for clarity only processing of even fields is described in detail. For odd fields odd field count value O_CNT(j, k) is used. When count value E_CNT(j, k) is greater than or equal to initial color-crossing threshold I_C_C_T, color-crossing error suppression unit 250 suppresses the color-crossing error in current pixel P(i, j, k) as explained below.

For PAL composite video signals, color-crossing error would cause both the U chrominance signal and the V chrominance signal to exhibit a specific pattern of two large chrominance values followed by two small chrominance values followed by two large chrominance values etc. For NTSC composite video signals, color-crossing error would cause both the U chrominance signal and the V chrominance signal to exhibit a specific pattern of alternating large and small chrominance values. To avoid confusion, the present invention is first described with respect to PAL video signals and then the modification for use with NTSC video signals is explained.

With a large enough video buffer, a color-crossing error detection unit could be constructed that checked whether the color-crossing pattern exists for an arbitrarily large number of fields as set by initial color-crossing threshold I_C_C_T. However, video buffers are very expensive. Therefore, some embodiments of the present invention make use of a smaller video buffer while still being able to check a large number of fields. For example, in one embodiment of the present invention the video buffer stores 10 fields so that 5 fields of the same field type can be analyzed at one time. However, using the techniques described below a detection of color-crossing error can use more than just 5 fields of the same field type. Specifically, (as illustrated in FIG. 2), the five fields are current field F(i), preceding field F(i−2), and succeeding fields F(i+2), F(i+4), and F(i+6). In the embodiment described below, color-crossing error detection unit 220 uses current pixel P(i, j, k) in current field F(i), and the corresponding pixels in succeeding fields F(i+2), F(i+4), and F(i+6) to detect color-crossing errors. For four pixels, the PAL color-crossing pattern of chrominance values can be expressed in one of four PAL color-crossing sub-patterns (PAL_S0, PAL_S1, PAL_S2, and PAL_S3) as listed in TABLE 1:

TABLE 1

| Name | 1st Chrom | 2nd Chrom | 3rd Chrom | 4th Chrom |
| --- | --- | --- | --- | --- |
| PAL_S0 | Large | Large | Small | Small |
| PAL_S1 | Large | Small | Small | Large |
| PAL_S2 | Small | Small | Large | Large |
| PAL_S3 | Small | Large | Large | Small |

For example, to determine whether a series of 8 corresponding pixels in 8 consecutive fields of the same field type satisfy the PAL color-crossing error pattern using Table 1, the pixels are divided into 5 subsets of four consecutive fields. Specifically, the subsets are S_0={P(i, j, k), P(i+2, j, k), P(i+4, j, k), P(i+6, j, k)}, S_1={P(i+2, j, k), P(i+4, j, k), P(i+6, j, k), P(i+8, j, k)}, S_2={P(i+4, j, k), P(i+6, j, k), P(i+8, j, k), P(i+10, j, k)}, S_3={P(i+6, j, k), P(i+8, j, k), P(i+10, j, k), P(i+12, j, k)}, and S_4={P(i+8, j, k), P(i+10, j, k), P(i+12, j, k), P(i+14, j, k)}. The chrominance values (U chrominance and V chrominance are compared independently) of each set must match the appropriate PAL color-crossing sub-pattern if the pixels exhibit the PAL color-crossing pattern. Specifically, if the chrominance values of set S_x matches PAL sub-pattern PAL_Sy, then the chrominance values of set S_(x+1) should match PAL color-crossing sub-pattern PAL_S((y+1) MOD 4), where MOD is the modulo function. Thus for example, if the chrominance values of set S_0 matches PAL color-crossing sub-pattern PAL_S2, then the chrominance values of set S_1 should match PAL color-crossing sub-pattern PAL_S3. Similarly, the chrominance values of set S_2 should match PAL color-crossing sub-pattern PAL_S0, the chrominance values of set S_3 should match PAL color-crossing sub-pattern PAL_S1, and the chrominance values of set S_4 should match PAL color-crossing sub-pattern PAL_S2. U chrominance values and V chrominance values are checked independently. Because noise can cause a set of pixels to not match the appropriate sub-pattern, in most embodiments of the present invention, color-crossing detection unit 220 determines that color-crossing error exists if either the U chrominance values or the V chrominance values match the appropriate PAL color-crossing sub-pattern.

Various pattern matching techniques can be used with the present invention to determine whether a set of pixels matches a PAL color-crossing sub-pattern. Most embodiments of the present invention determine a PAL color-crossing sub-pattern match by determining whether every chrominance value that should be a "Large" value is greater than every chrominance value that should be a "Small" value. Other embodiments of the present invention may use a coring threshold CT. In these embodiments, a PAL color-crossing sub-pattern match is detected only when every chrominance value that should be a "Large" value is greater than every chrominance value that should be a "Small" value by coring threshold CT.

Figure 4:
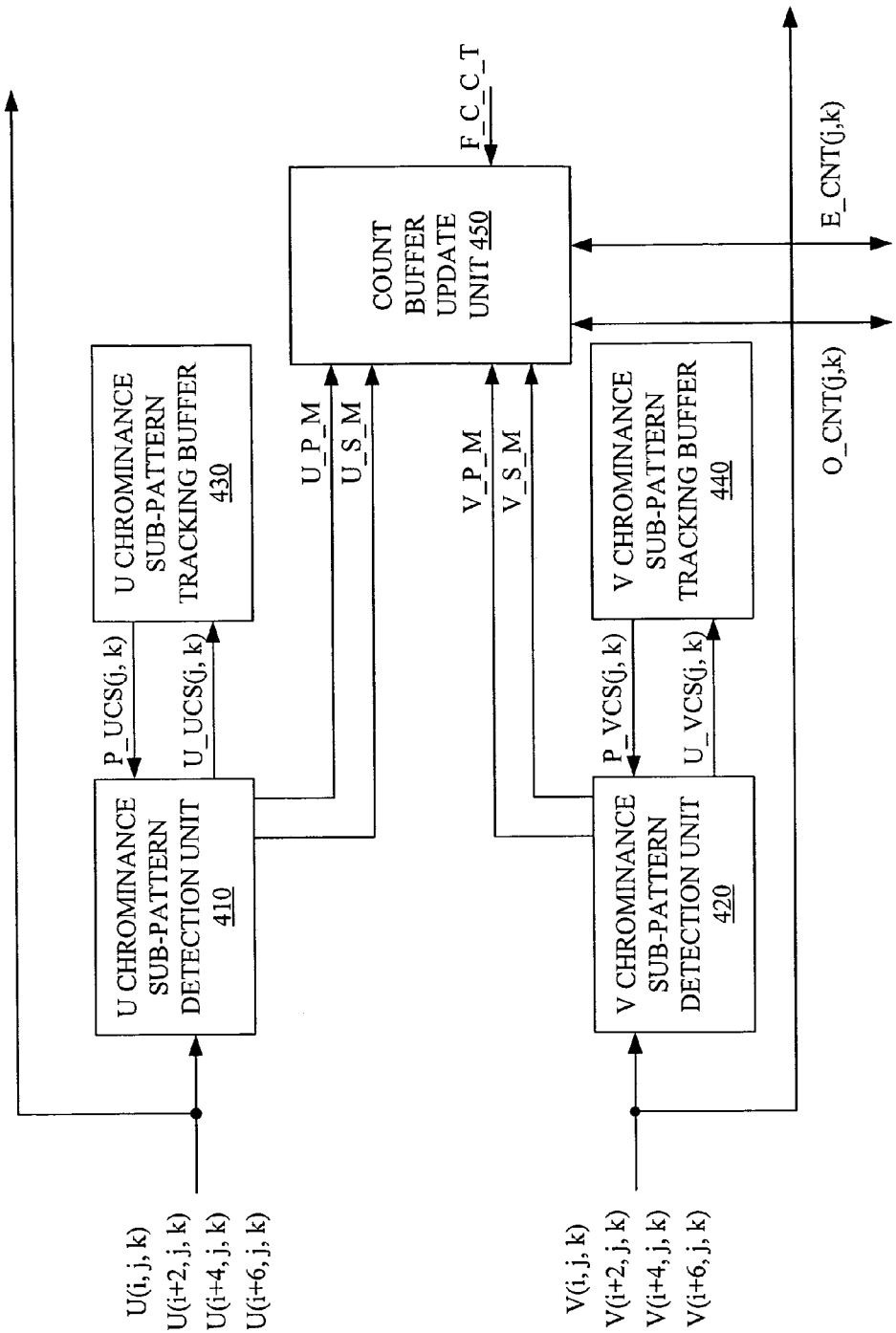
FIG. 4 is a simplified block diagram of a color-crossing error detection unit in accordance with one embodiment of the present invention.

FIG. 4 is a simplified block diagram of one embodiment of color-crossing error detection unit 220. The embodiment of FIG. 4 includes a U chrominance sub-pattern detection unit 410, a V chrominance sub-pattern detection unit 420, a U chrominance sub-pattern tracking buffer 430, a V chrominance sub-pattern tracking buffer 440, and a count buffer update unit 450. U chrominance sub-pattern detection unit 410 receives U chrominance values U(i, j, k), U(i+2, j, k), U(i+4, j, k) and U(i+6, j, k) of the current set of pixels (P(i, j, k), P(i+2, j, k), P(i+4, j, k) and P(i+6, j, k)) and determines whether the received U chrominance values matches a PAL color-crossing sub-pattern. To reduce accesses to video buffer 210, the embodiments of color-crossing error detection unit 220 shown in FIGS. 2, 4, and 7 (described below) provides the U chrominance values and V chrominance values to color-crossing error suppression unit 250. However other embodiments of the present invention can have color-crossing error suppression unit 250 read the chrominance values directly from video buffer 210.

Furthermore, U chrominance sub-pattern detection unit 410 receives a previous U chrominance sub-pattern value P_UCS(j, k) for the pixel location of current pixel P(i, j, k). Previous U chrominance sub-pattern value P_UCS(j, k) indicates which PAL color-crossing sub-pattern was matched by the U chrominance values of the previous set of pixels at the same pixel location as current pixel P(i, j, k). In addition, previous U chrominance sub-pattern value P_UCS(j, k) may take on a reserved value to indicate that the U chrominance values of the previous set of pixels did not match any of the PAL color-crossing sub-patterns. U Chrominance sub-pattern detection unit 410 generates a U chrominance sub-pattern match signal U_S_M, which indicates that the U chrominance values of the current set of pixels received by U chrominance sub-pattern detection unit 410 matched a PAL color-crossing sub-pattern and a U chrominance pattern match signal U_P_M, which indicates that the U chrominance values of the current set of pixels received by U chrominance sub-pattern detection unit 410 matched the appropriate PAL color-crossing sub-pattern. Specifically, when the U chrominance values of the current set of pixels received by U chrominance sub-pattern detection unit 410 matches any PAL color-crossing sub-pattern, U chrominance sub-pattern match signal U_S_M is driven to a match logic level (e.g., logic high). Otherwise, U chrominance sub-pattern match signal U_S_M is driven to a not match logic level (e.g., logic low). When the set of pixels matches the PAL color-crossing sub-pattern that follows the pattern indicated by previous U chrominance sub-pattern value P_UCS(j, k) then U chrominance pattern match signal U_P_M is driven to a match logic level (e.g., logic high). Otherwise, U chrominance pattern match signal U_P_M is driven to a not matched logic level (e.g., logic low). U chrominance sub-pattern detection unit 410 drives U chrominance sub-pattern match signal U_S_M and U chrominance pattern match signal U_P_M to count buffer update unit 450. After generating U chrominance sub-pattern match signal U_S_M and U chrominance pattern match signal U_P_M, U chrominance sub-pattern detection unit 410 writes an updated U chrominance sub-pattern value U_UCS(j, k), which indicates which PAL color-crossing sub-pattern was matched by the U chrominance values of the current set of pixels, in U chrominance sub-pattern tracking buffer 430.

V chrominance sub-pattern detection unit 420 receives V chrominance values V(i, j, k), V(i+2, j, k), V(i+4, j, k) and V(i+6, j, k) and determines whether the received V chrominance values matched a PAL color-crossing sub-pattern. V chrominance sub-pattern detection unit 420 performs the same function as U chrominance sub-pattern detection unit 410 except with the V chrominance values, previous V chrominance sub-pattern value P_VCS(j, k) from V chrominance sub-pattern tracking buffer 440, updated V chrominance sub-pattern value U_VCS(j, k), V chrominance sub-pattern match signal V_S_M, and V chrominance pattern match signal V_P_M. Therefore for brevity the description is not repeated.

U chrominance sub-pattern tracking buffer 430, which stores a U chrominance sub-pattern value for each pixel location, is used by U chrominance sub-pattern detection unit 410 as described above. Similarly, V chrominance sub-pattern tracking buffer 440 stores a V chrominance sub-pattern value for each pixel location and is used by V chrominance sub-pattern detection unit 420.

Count buffer update unit 450 reads and updates count value E_CNT(j, k) from even field count buffer 230, which corresponds to the pixel location of current pixel P(i, j, k). Count value E_CNT(j, k) is equal to the number of consecutive sets of pixels that have matched the appropriate PAL color crossing sub-pattern. However, in many embodiments of the present invention, count value E_CNT(j, k) is limited to a maximum value, which is greater than or equal to initial color-crossing threshold I_C_C_T and final color-crossing threshold F_C_C_T, to minimize the size of even field count buffer 230. As stated above, the description assumes field F(i) is an even field. If field F(i) were an odd field, then count value O_CNT(j, k) is used. The updated value of count value E_CNT(j, k) depends on the values of U chrominance sub-pattern match signal U_S_M, U chrominance pattern match signal U_P_M, V chrominance sub-pattern match signal V_S_M, V chrominance pattern match signal V_P_M, and final color-crossing threshold F_C_C_T. Specifically, when either V chrominance pattern match signal V_P_M or U chrominance pattern match signal U_P_M are at the match logic level then count value E_CNT(j, k) is incremented unless count value E_CNT is equal to or greater than final color-crossing threshold F_C_C_T. When both V chrominance pattern match signal V_P_M and U chrominance pattern match signal U_P_M are at the not match logic level and either V chrominance sub-pattern match signal V_S_M or U chrominance sub-pattern match signal U_S_M are at the match logic level then count value E_CNT(j, k) is set equal to 1. However, when all of the match signals are at the not match logic level, count value E_CNT(j, k) is set equal to zero.

Figure 5:
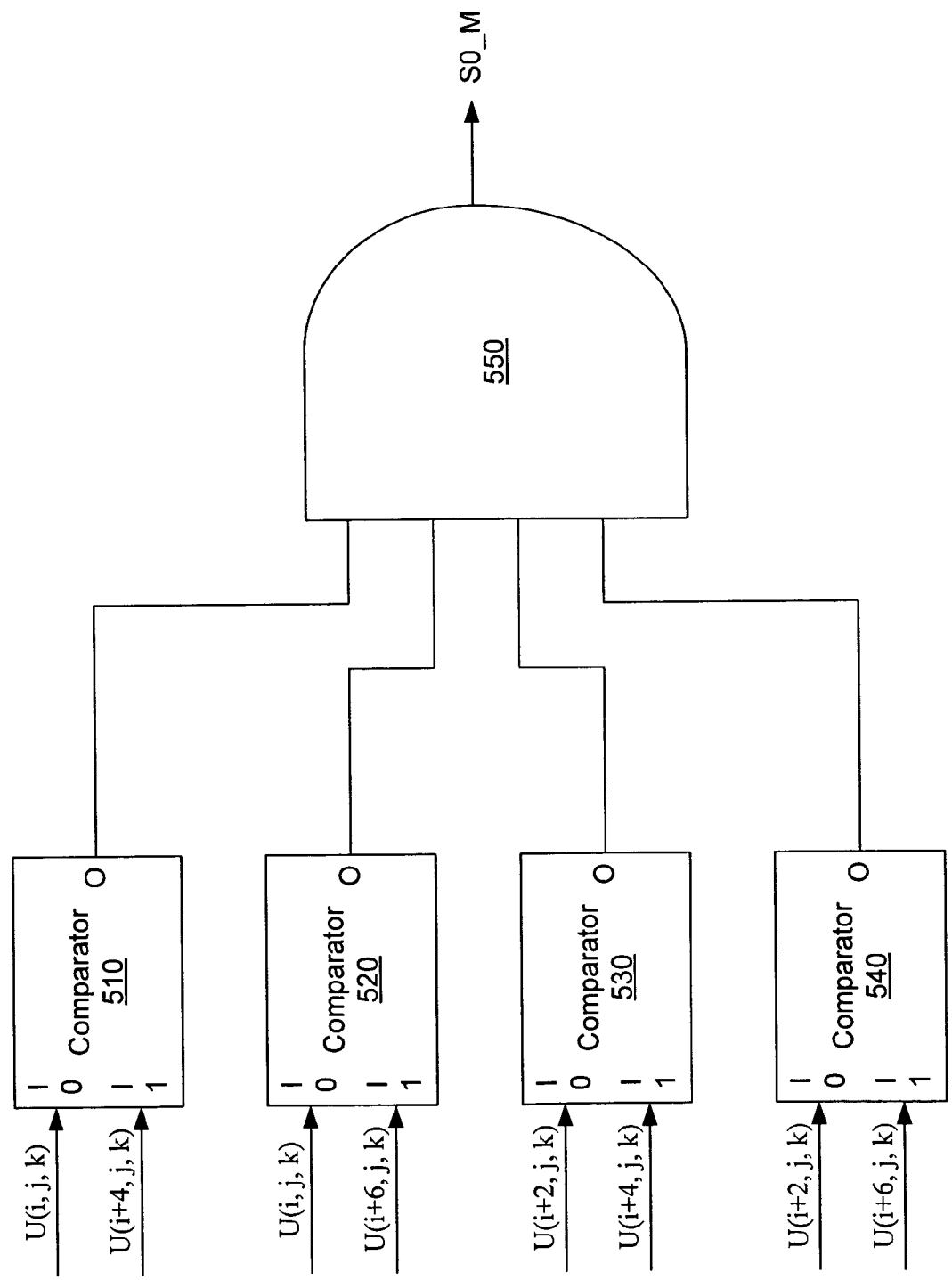
FIG. 5 is a simplified block diagram of a portion of a U chrominance sub-pattern detection unit for PAL video signals in accordance with one embodiment of the present invention.

U chrominance sub-pattern detection unit 410 can be implemented directly using 4 comparators for each PAL color-crossing sub-pattern. For example, FIG. 5 shows a block diagram of a circuit that determines whether the U chrominance values of the current set of pixels matches sub-pattern PAL_S0. The embodiment of FIG. 5 includes comparators 510, 520, 530, and 540 and an AND gate 550. Comparators 510, 520, 530, and 540, which each have a first input port I0, a second input port I1, and an 1-bit output terminal O, are configured to output a logic high if the input value on input port I0 is greater than the input value on input port I1. To match sub-pattern PAL_S0 ("Large Large Small Small"), U chrominance values U(i, j, k) and U(i+2, j, k) should be larger than U chrominance values U(i+4, j, k) and U(i+6, j, k). Thus, as shown in FIG. 5, U chrominance value U(i, j, k) is applied to the first input port of comparators 510 and 520, U chrominance value U(i+2, j, k) is applied to the first input port of comparators 530 and 540, U chrominance value U(i+4, j, k) is applied to the second input port of comparators 510 and 530, and U chrominance value U(i+6, j, k) is applied to the second input port of comparators 520 and 540. The output ports of comparators 510, 520, 530 and 540 are coupled to the input terminals of AND gate 550, which provides a sub-pattern 0 match signal S0_M. If the U chrominance values matches sub-pattern PAL_S0, AND gate 550 drives a sub-pattern 0 match signal S0_M to a match logic level (i.e., logic high). Otherwise AND gate 550 drives sub-pattern 0 match signal S0_M to a not match logic level, (i.e., logic low). For embodiments of the present invention using coring threshold C_T, an adder should be inserted in front of second input terminal I1 of each comparator to add coring threshold C_T to the U chrominance signal. One skilled in the art can easily modify the circuit of FIG. 5 to generate sub-pattern match signals S1_M, S2_M, and S3_M for sub-patterns PAL_S1, PAL_S2, and PAL_S3, respectively. Repeating the circuit of FIG. 5 for each of the four sub-patterns would require 12 comparators and four AND gates. Only 12 comparators are needed due to replication of comparisons between sub-patterns. For example, both sub-patterns PAL_S0 and PAL_S1 requires that U chrominance value U(i, j, k) be larger than U chrominance value U(i+4, j, k). In general, at most one of the sub-pattern match signals (S0_M, S1_M, S2_M, or S3_M) should be at logic high at any given time.

Figure 6:
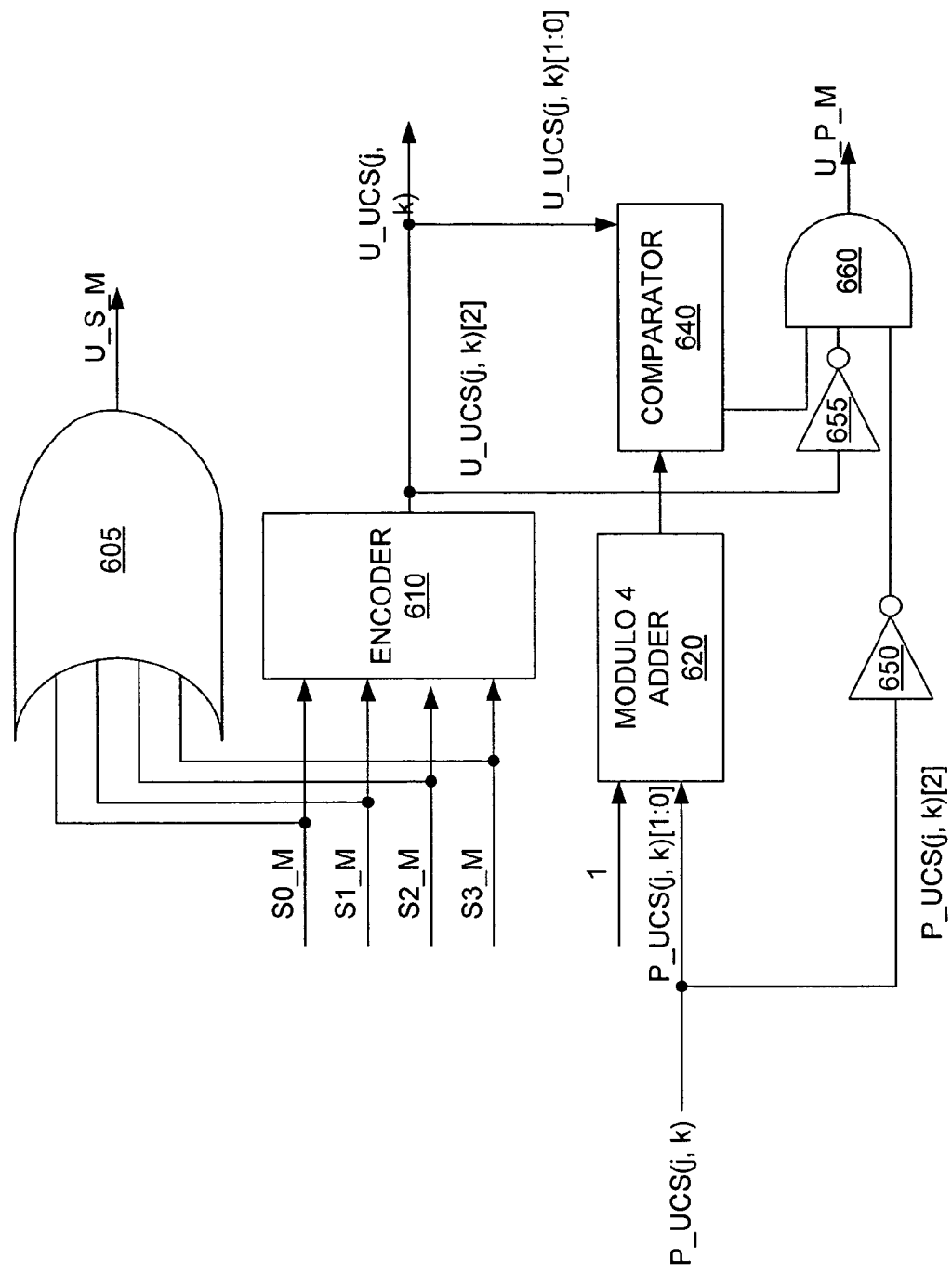
FIG. 6 is a simplified block diagram of another portion of a U chrominance sub-pattern detection unit for PAL video signals in accordance with one embodiment of the present invention.

FIG. 6 is a block diagram of the portion of U chrominance sub-pattern detection unit 410 that generates U chrominance sub-pattern match signal U_S_M, U chrominance pattern match signal U_P_M, and updated U chrominance sub-pattern value U_UCS(j, k). Specifically, a four-input OR gate 605 receives sub-pattern match signal S0_M, S1_M, S2_M, and S3_M and generates U chrominance sub-pattern match signal U_S_M. An encoder 610, which also receives sub-pattern match signal S0_M, S1_M, S2_M, and S3_M, generates updated U chrominance sub-pattern value U_UCS(j, k). Table 2 shows the truth table for encoder 610. As shown in Table 2 the reserved value is equal to 4. Any combination of sub-pattern match signals that does not appear in table 2 is an error condition, but updated U chrominance sub-pattern value U_UCS(j, k) would still take on the reserved value of 4.

TABLE 2

| S0_M | S1_M | S2_M | S3_M | U_UCS(j, k) |
|---|---|---|---|---|
| 1 | 0 | 0 | 0 | 0 |
| 0 | 1 | 0 | 0 | 1 |

TABLE 2-continued

| S0_M | S1_M | S2_M | S3_M | U_UCS(j, k) |
|---|---|---|---|---|
| 0 | 0 | 1 | 0 | 2 |
| 0 | 0 | 0 | 1 | 3 |
| 0 | 0 | 0 | 0 | 4 |

A modulo 4 adder 620 performs addition with 1 and the two lower order bits of previous U chrominance sub-pattern value P_USC(j, k). For clarity, when a subset of the bits of a number NUM are referenced in the figures the notation NUM[a:b] is used where NUM[a:b] refers to the subset bits from bit "b" to bit "a" of number NUM inclusive, where the rightmost (and lowest order bit) of number NUM is bit "0". Similarly if a single bit of a number NUM is referenced in the figures the notation NUM[c] is used to refer to bit "c" of number NUM. Thus the two lower order bits of previous U chrominance sub-pattern value P_USC(j,k) is denoted as P_USC(j,k)[1:0] and bit 2 of previous U chrominance sub-pattern value P_USC(j,k) is denoted as P_USC(j,k)[2].

The output of modulo 4 adder 620 indicates what value updated U chrominance sub-pattern value U_UCS(j, k) should be. Therefore, comparator 640 determines whether the output of modulo 4 adder 620 is equal to the two lower order bits of updated chrominance sub-pattern value U_UCS(j, k) from encoder 610 and provides the result of the comparison to an input terminal of an AND gate 660. The high order bit (i.e. bit 2) of updated U chrominance sub-pattern value U_UCS(j, k), i.e. U_UCS(j,k)[2], is applied to the input terminal of an inverter 655, which has an output terminal coupled to a second input terminal of AND gate 660. Similarly, the high order bit (i.e., bit 2) of previous U chrominance sub-pattern value P_UCS(j, k), i.e. P_UCS(j, k)[2]) is applied to the input terminal of an inverter 650, which has an output terminal coupled to a third input terminal of AND gate 660. AND gate 660 provides U chrominance pattern match signal U_P_M. When previous U chrominance sub-pattern value P_UCS(j, k) is equal to the reserved value (indicating that the previous set of pixels did not match any of the sub-patterns) the upper order bit previous U chrominance sub-pattern value P_UCS (j, k) is at logic high. Therefore, providing the upper order bit through inverter 650 to an input terminal of AND gate 660 causes AND gate 660 to drive U chrominance pattern match signal U_P_M to the unmatched logic level (i.e., logic low). Similarly, when updated U chrominance sub-pattern value U_UCS(j, k) is equal to the reserved state, AND gate 660 drives U chrominance pattern match signal U_P_M to the unmatched logic level (i.e., logic low). When neither previous U chrominance sub-pattern value P_UCS(j, k) nor updated U chrominance sub-pattern value U_UCS(j, k) are equal to the reserved state, AND gate 660 drives U chrominance pattern match signal U_P_M to the match logic level (i.e. logic high) when the two lower bits of the updated U chrominance sub-pattern value, i.e. U_UCS(j, k)[1:0], is equal to the two lower bits of the previous U chrominance sub-pattern value, i.e. P_UCS(j, k)[1:0], plus one modulo 4.

Figure 7:
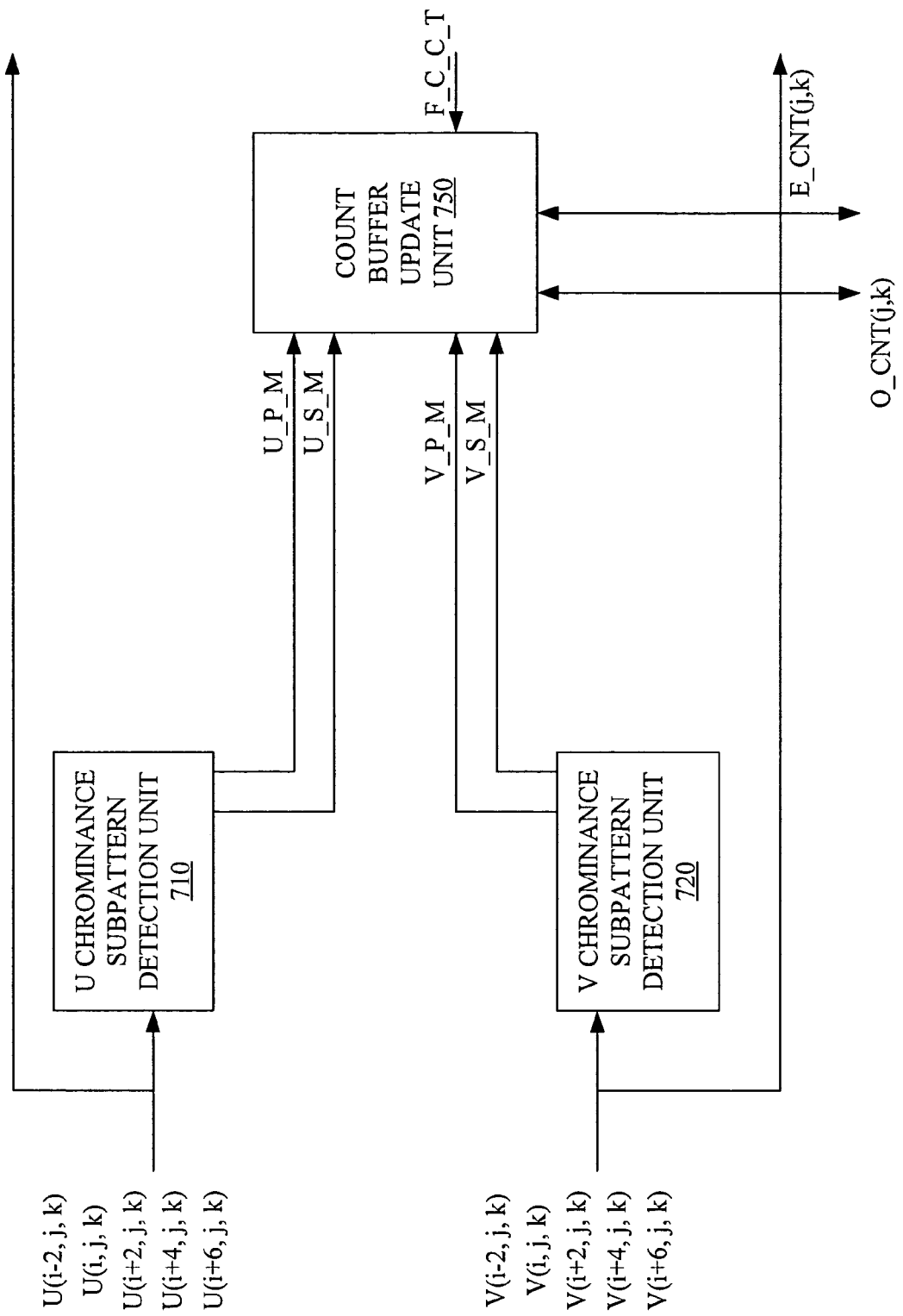
FIG. 7 is a simplified block diagram of a color-crossing error detection unit in accordance with another embodiment of the present invention.

In some embodiments of the present invention, U chrominance sub-pattern tracking buffer 430 and V chrominance sub-pattern tracking buffer 440 are not used. FIG. 7 is a simplified block diagram of another embodiment of color-crossing error detection unit 220. The embodiment of FIG. 7 includes a U chrominance sub-pattern detection unit 710, a V chrominance sub-pattern detection unit 720, and a count buffer update unit 750. U chrominance sub-pattern detection unit 710 receives U chrominance values U(i−2, j, k), U(i, j, k), U(i+2, j, k), U(i+4, j, k) and U(i+6, j, k) and determines whether U chrominance values U(i, j, k), U(i+2, j, k), U(i+4, j, k) and U(i+6, j, k) (i.e., the U chrominance values of the current set of pixels) matches a PAL color-crossing sub-pattern. Furthermore, U chrominance sub-pattern detection unit 710 determines whether U chrominance values U(i−2, j, k), U(i, j, k), U(i+2, j, k) and U(i+4, j, k) (i.e. the U chrominance values of the previous set of pixels) matches a PAL color-crossing sub-pattern. Using these determinations, U chrominance sub-pattern detection unit 710 generates U chrominance sub-pattern match signal U_S_M and U chrominance pattern match signal U_P_M, which are described above. The circuitry described above and illustrated in FIGS. 5 and 6 can also be used in U chrominance sub-pattern detection unit 710.

V chrominance sub-pattern detection unit 720 receives V chrominance values V(i−2, j, k), V(i, j, k), V(i+2, j, k), V(i+4, j, k) and V(i+6, j, k) and generates V chrominance sub-pattern match signal V_S_M, and V chrominance pattern match signal V_P_M. Because V chrominance sub-pattern detection unit 720 performs the same function as U chrominance sub-pattern detection unit 710 the description is not repeated. Count buffer update unit 750 performs the same functions as described above with respect to count buffer update unit 450. Therefore, for brevity the description is not repeated.

Returning to FIG. 2, after color-crossing error detection unit 220 updates even count value E_CNT(j, k), color-crossing error suppression unit 250 suppresses color-crossing error in current pixel P(i, j, k) if count value E_CNT(j, k) is greater than or equal to initial color-crossing threshold I_C_C_T. Various color suppression techniques can be performed by color-crossing error suppression unit 250. For example, in one embodiment of the present invention color-crossing error suppression unit 250 sets both U chrominance value U(i, j, k) and V chrominance value V(i, j, k) to zero, which causes current pixel P(i, j, k) to be colorless. However, color-crossing error often occurs in colored area so turning current pixel P(i, j, k) colorless may not result in a high quality image.

In another embodiment of the present invention an updated U chrominance value U_U(i, j, k) is set equal to the average of the U chrominance values of the set of current pixels. Similarly, an updated V chrominance value U_V(i, j, k) is set to the average of the V chrominance of the set of current pixels. The entire set of current pixels is used to provide two "Large" and two "Small" chrominance values. Equations EQ1(a) and EQ1 (b) provides the formula for calculating updated U chrominance value U_U(i, j, k) and updated V chrominance value U_V(i, j, k), respectively. Updated U chrominance value U_U (i, j, k) and updated V chrominance value U_V(i, j, k) are written to video buffer 210 to replace U chrominance value U(i, j, k) and V chrominance value V(i, j, k) of current pixel P(i, j, k).

$$U\_U(i, j, k) = [U(i, j, k) + U(i+2, j, k) + U(i+4, j, k) + U(i+6, j, k)]/4 \quad \text{EQ 1(a)}$$

$$U\_V(i, j, k) = [V(i, j, k) + V(i+2, j, k) + V(i+4, j, k) + V(i+6, j, k)]/4 \quad \text{EQ 1(b)}$$

For some low cost embodiments of the present invention, updated U chrominance values U_U(i, j, k) and updated V chrominance value U_V(i, j, k) may be calculated by averaging only two chrominance values. Specifically, one "Large" and one "Small" chrominance value should be used. Equations EQ2(a) and EQ2(b) provides alternate formulas for calculating updated U chrominance value U_U(i, j, k) and updated V chrominance value U_V(i, j, k), respectively, for PAL video signals. (As explained below for NTSC video signals slight modifications are necessary).

$$U\_U(i,j,k)=[U(i,j,k)+U(i+4,j,k)]/2 \quad \text{EQ2(a)}$$

$$U\_V(i,j,k)=[V(i,j,k)+V(i+4,j,k)]/2 \quad \text{EQ2(b)}$$

In still other embodiments of the present invention, an iterative approach is taken which calculates updated U chrominance values U_U(i, j, k) using a combination of previous U chrominance values from previous fields with U chrominance values from current and/or subsequent fields. For example in one embodiment of the present invention, updated U chrominance value U_U(i, j, k) is set equal to a weighted average of U chrominance values U(i, j, k) and U(i−4, j, k). For PAL video signals, U chrominance value U(i−4, j, k) is used with U chrominance value U(i, j, k) because one of the two U chrominance values is "Large" and the other one is "Small" when color-crossing error exists at current pixel P(i, j, k). Similarly, updated V chrominance value U_V(i, j, k) is set to a weighted average of V chrominance values V(i, j, k) and V(i−4, j, k). Equations EQ3(a) and EQ3(b) provides the formula for calculating updated U chrominance value U_U(i, j, k) and updated V chrominance value U_V(i, j, k), respectively. In equations EQ3(a) and EQ3(b), q is a user configurable weighting factor between 0 and 1, inclusive. Smaller values of weighting factor q provide greater color-crossing error suppression. When weighting factor q equals 1 color-crossing error suppression is effectively "turned off".

$$U\_U(i,j,k)=[(1-q)*U(i-4,j,k)+q*U(i,j,k)] \quad \text{EQ3(a)}$$

$$U\_V(i,j,k)=[(1-q)*V(i-4,j,k)+q*V(i,j,k)] \quad \text{EQ3(b)}$$

However, some embodiments of the present invention do not store preceding field F(i−4) but do store preceding field F(i−2) in video buffer 210. For these embodiments U chrominance value U(i−2, j, k) is used in place of U chrominance value U(i−4, j, k) in equation EQ3(a). Similarly, V chrominance value V(i−2, j, k) is used in place of V chrominance value V(i−4, j, k) in equation EQ3(b). Although U chrominance value U(i, j, k) and U chrominance value U(i−2, j, k) may not always have the "Large" "Small" relationship in PAL video signals, updated U chrominance value U_U(i, j, k) would still converge to provide satisfactory results. Similarly updated V chrominance value U_V(i, j, k) would converge even using V chrominance value V(i−2, j, k). Equations EQ4(a) and EQ4(b) provides the formula for calculating updated U chrominance value U_U(i, j, k) and updated V chrominance value U_V(i, j, k), respectively, when field F(i−4) is not available but field F(i−2) is available.

$$U\_U(i,j,k)=[(1-q)*U(i-2,j,k)+q*U(i,j,k)] \quad \text{EQ4(a)}$$

$$U\_V(i,j,k)=[(1-q)*V(i-2,j,k)+q*V(i,j,k)] \quad \text{EQ4(b)}$$

Some embodiments of the present invention do not store any previous fields. For these embodiments the iterative suppression technique is not used.

In some embodiments of the present invention, a novel two step suppression procedure combines multiple suppression techniques to calculate updated U chrominance value U_U(i, j, k) and updated V chrominance value U_V(i, j, k) depending on how many fields have been modified by color-crossing error suppression at the pixel location of current pixel P(i, j, k). Specifically, one suppression technique is applied when count value E_CNT(j, k) is greater than or equal to initial color-crossing threshold I_C_C_T and less than final color-crossing threshold F_C_C_T. Then a second suppression technique is used when count value E_CNT(j, k) is greater than or equal to final color-crossing threshold F_C_C_T. In most embodiments of the present invention using multiple suppression techniques, count value E_CNT(j, k) not incremented after reaching final color-crossing threshold F_C_C_T to prevent count value E_CNT(j, k) from surpassing the maximum value allowed in even count buffer 230.

In an embodiment of the present invention, which stores previous field F(i−2) in video buffer 210, color-crossing error suppression unit 250 combines an averaging suppression technique, with an iterative suppression technique. Specifically, when count value E_CNT(j, k) is greater than or equal to initial color-crossing threshold I_C_C_T and less than final color-crossing threshold F_C_C_T, color-crossing error suppression unit 250 calculates updated chrominance values using the averaging technique of equations EQ1 (a) and EQ1 (b). Then, when count value E_CNT(j, k) is greater than or equal to final color-crossing threshold F_C_C_T, color-crossing error suppression unit 250 calculates updated chrominance values using the iterative technique of equations EQ4 (a) and EQ4 (b), with a relatively small value for weighting factor q, such as 0.375. In another embodiment of the present invention the averaging technique of equations EQ2(a) and EQ2(b) are used instead of the averaging technique of equations EQ1 (a) and EQ1 (b). Usually using equations EQ1(a) and EQ1(b) provides better color-crossing suppression than using EQ2 (a) and EQ2 (b).

In another embodiments of the present invention, which stores previous field F(i−2) in video buffer 210, color-crossing error suppression unit 250 uses two iterative suppression techniques. Specifically, when count value E_CNT(j, k) is greater than or equal to initial color-crossing threshold I_C_C_T and less than final color-crossing threshold F_C_C_T, color-crossing error suppression unit 250 calculates updated chrominance values using the iterative technique of equations EQ4(a) and EQ4(b), with a relatively large value for weighting factor q, such as 0.625. Then, when count value E_CNT(j, k) is greater than or equal to final color-crossing threshold F_C_C_T, color-crossing error suppression unit 250 calculates updated chrominance values using the iterative technique of equations EQ4(a) and EQ4(b), with a relatively small value for weighting factor q, such as 0.375. In general small values for weighting factor q are less than 0.5. and large values for weighting factor q are greater than 0.5

In an embodiment of the present invention, which stores previous field F(i−4) in video buffer 210, color-crossing error suppression unit 250 combines an averaging suppression technique, with an iterative suppression technique. Specifically, when count value E_CNT(j, k) is greater than or equal to initial color-crossing threshold I_C_C_T and less than final color-crossing threshold F_C_C_T, color-crossing error suppression unit 250 calculates updated chrominance values using the averaging technique of equations EQ1 (a) and EQ1 (b). Then, when count value E_CNT(j, k) is greater than or equal to final color-crossing threshold F_C_C_T, color-crossing error suppression unit 250 calculates updated chrominance values using the iterative technique of equations EQ3 (a) and EQ3 (b), with a relatively small value for weighting factor q, such as 0.375. In another embodiment of the present invention the averaging technique of equations EQ2 (a) and EQ2(b) are used instead of the averaging technique of equations EQ1 (a) and EQ1 (b). Usually using equations EQ1(a) and EQ1(b) provides better color-crossing suppression than using EQ2 (a) and EQ2 (b).

In another embodiments of the present invention, which stores previous field F(i−4) in video buffer 210, color-crossing error suppression unit 250 uses two iterative suppression techniques. Specifically, when count value E_CNT(j, k) is greater than or equal to initial color-crossing threshold I_C_C_T and less than final color-crossing threshold F_C_C_T, color-crossing error suppression unit 250 calculates updated chrominance values using the iterative technique of equations EQ3 (a) and EQ3 (b), with a relatively large value for weighting factor q, such as 0.625. Then, when count value E_CNT(j, k) is greater than or equal to final color-crossing threshold F_C_C_T, color-crossing error suppression unit 250 calculates updated chrominance values using the iterative technique of equations EQ3 (a) and EQ3 (b), with a relatively small value for weighting factor q, such as 0.375.

Figure 8:
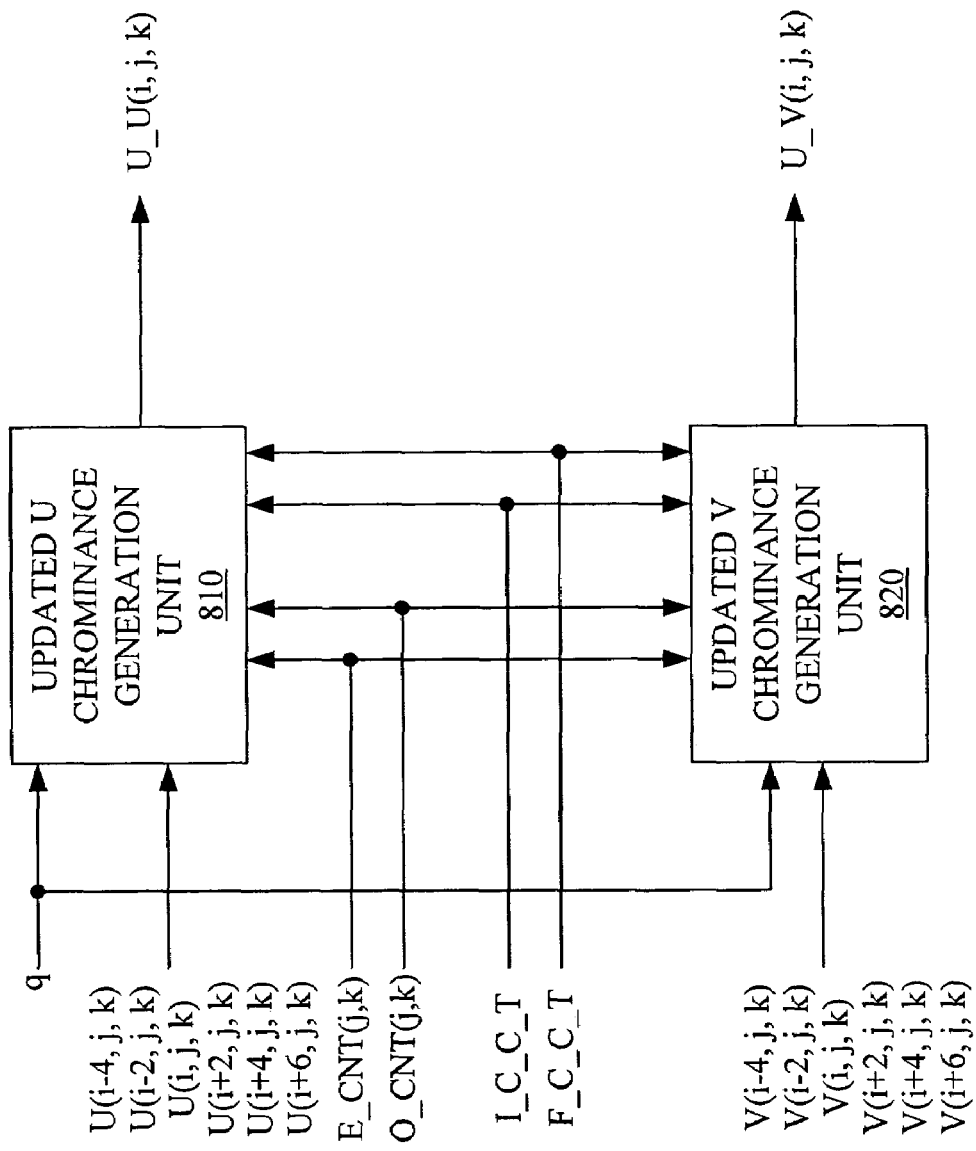
FIG. 8 is a simplified block diagram of a color-crossing error suppression unit in accordance with one embodiment of the present invention.

FIG. 8 is a block diagram of an embodiment of color-crossing error suppression unit 250 that can use different color-crossing error suppression techniques. The embodiment of FIG. 8 includes a updated U chrominance generation unit 810 for generating updated U chrominance value U_U(i, j, k) and a updated V chrominance generation unit 820 for generating updated V chrominance value U_V(i, j, k).

Updated U chrominance generation unit 810 receives weighting factor q, initial color-crossing threshold I_C_C_T, final color-crossing threshold F_C_C_T, count value E_CNT (j, k) (for even fields), count value O_CNT(j, k) (for odd fields), and a plurality of U chrominance values, which may include U chrominance values U(i−4, j, k), U(i−2, j, k), U(i, j, k), U(i+2, j, k), U(i+4, j, k), and U(i+6, j, k). Similarly, V chrominance generation unit 820 receives weighting factor q, initial color-crossing threshold I_C_C_T, final color-crossing threshold F_C_C_T, count value E_CNT(j, k) (for even fields), count value O_CNT(j, k) (for odd fields), and a plurality of V chrominance values, which may include V chrominance values V(i−4, j, k), V(i−2, j, k), V(i, j, k), V(i+2, j, k), V(i+4, j, k), and V(i+6, j, k). When count value E_CNT(j, k) (as explained above, the description herein assumes current field F(i) is an even field) is less than initial color-crossing threshold I_C_C_T, updated U chrominance generation unit 810 remains idle. However, when count value E_CNT(j, k) is greater than or equal to initial color-crossing threshold I_C_C_T then updated U chrominance generation unit 810 calculates a value for updated chrominance value U_U(i, j, k), which is written into video buffer 210, using a first suppression technique. Then, when count value E_CNT(j, k) is greater than or equal to final color-crossing threshold F_C_C_T, updated U chrominance generation unit 810 calculates a value for updated chrominance value U_U(i, j, k), which is written into video buffer 210, using a second suppression technique.

Updated V chrominance generation unit 820 is functionally identical with updated U chrominance generation unit 810. Therefore for brevity the description is not repeated.

As stated above, the present invention can perform color-crossing suppression for both PAL and NTSC decoded composite video signals. Minor changes to the description and circuits given above are required to process NTSC video signals. As stated above, in decoded NTSC composite video signals, color-crossing error would cause both the U chrominance signal and the V chrominance signal to exhibit a specific pattern of alternating large and small chrominance values. Therefore, for four pixels at the same pixel location in four consecutive fields of the same field type, the NTSC color-crossing patterns of chrominance values can be one of two NTSC color-crossing sub-patterns (NTSC_S0 and NTSC_S1) as listed in TABLE 3:

TABLE 3

| Name | 1st Chrom | 2nd Chrom | 3rd Chrom | 4th Chrom |
|---|---|---|---|---|
| NTSC_S0 | Large | Small | Large | Small |
| NTSC_S1 | Small | Large | Small | Large |

To determine whether a series of 8 corresponding pixels in 8 consecutive fields of the same field type satisfy the NTSC error crossing pattern using Table 3, the pixels are divided into 5 subsets of four consecutive fields. Specifically, the subsets are S_0={P(i, j, k), P(i+2, j, k), P(i+4, j, k), P(i+6, j, k)}, S_1={P(i+2, j, k), P(i+4, j, k), P(i+6, j, k), P(i+8, j, k)}, S_2={P(i+4, j, k), P(i+6, j, k), P(i+8, j, k), P(i+10, j, k)}, S_3={P(i+6, j, k), P(i+8, j, k), P(i+10, j, k), P(i+12, j, k)}, and S_4={P(i+8, j, k), P(i+10, j, k), P(i+12, j, k), P(i+14, j, k)}. The chrominance values (U chrominance and V chrominance are compared independently) of each set must match the appropriate NTSC color-crossing sub-pattern if the pixels exhibit the NTSC color-crossing pattern. Specifically, if the chrominance values of set S_x patches NTSC sub-pattern NTSC_Sy, then the chrominance values of set S_(x+1) should match NTSC color-crossing sub-pattern NTSC_S((y+1) MOD 2), where MOD is the modulo function. Thus for example, if the chrominance values of set S_0 matches NTSC color-crossing sub-pattern NTSC_S1, then the chrominance values of set S_1 should match NTSC color-crossing sub-pattern NTSC_S0. Similarly, the chrominance values of set S_2 should match NTSC color-crossing sub-pattern NTSC_S1, the chrominance values of set S_3 should match NTSC color-crossing sub-pattern NTSC_S0, and the chrominance values of set S_4 should match NTSC color-crossing sub-pattern NTSC_S1. U chrominance values and V chrominance values are checked independently. As explained above, because noise can cause a set of pixels to not match the appropriate sub-pattern, in most embodiments of the present invention, color-crossing detection unit 220 determines that color-crossing error exists if either the U chrominance values or the V chrominance values match the appropriate NTSC color-crossing sub-pattern.

Figure 9:
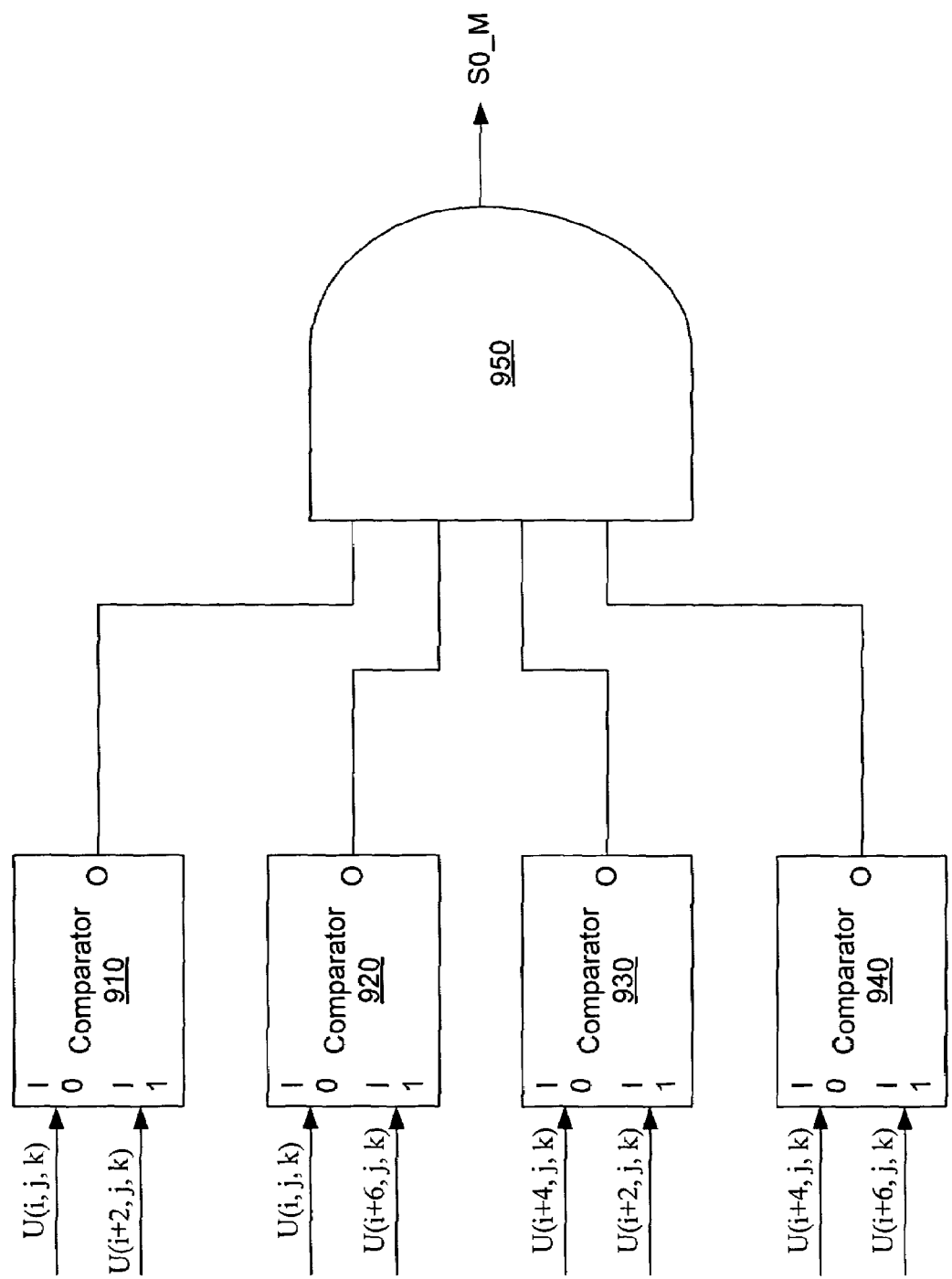
FIG. 9 is a simplified block diagram of a portion of a U chrominance sub-pattern detection unit for NTSC video signals in accordance with one embodiment of the present invention.

The embodiments described above are easily adapted to use NTSC sub-patterns rather than PAL sub-patterns for NTSC video signals. For example, FIG. 9 is a block diagram of a circuit that determines whether the U chrominance values of the current set of pixels matches sub-pattern NTSC_S0. The embodiment of FIG. 9 includes comparators 910, 920, 930, and 940 and an AND gate 950. Comparators 910, 920, 930, and 940, which each have a first input port I0, a second input port I1, and an 1-bit output terminal O, are configured to output a logic high if the input value on input port I0 is greater than the input value on input port I1. To match sub-pattern NTSC_S0 ("Large Small Large Small"), U chrominance values U(i, j, k) and U(i+4, j, k) should be larger than U chrominance values U(i+2, j, k) and U(i+6, j, k). Thus, as shown in FIG. 9, U chrominance value U(i, j, k) is applied to the first input port of comparators 910 and 920, U chrominance value U(i+4, j, k) is applied to the first input port of comparators 930 and 940, U chrominance value U(i+2, j, k) is applied to the second input port of comparators 910 and 930, and U chrominance value U(i+6, j, k) is applied to the second input port of comparators 920 and 940. The output ports of comparators 910, 920, 930 and 940 are coupled to the input terminals of AND gate 950, which provides a sub-pattern 0 match signal S0_M. If the U chrominance values matches sub-pattern NTSC_S0, AND gate 950 drives sub-pattern 0 match signal S0_M to a match logic level (i.e., logic high). Otherwise AND gate 950 drives sub-pattern 0 match signal S0_M to a not match logic level, (i.e., logic low). For embodiments of the present invention using coring threshold C_T, an adder should be inserted in front of second input terminal I1 of each comparator to add coring threshold C_T to the U chrominance signal. One skilled in the art can easily modify the circuit of FIG. 9 to generate sub-pattern match signals S1_M, for sub-patterns NTSC_S1.

Figure 10:
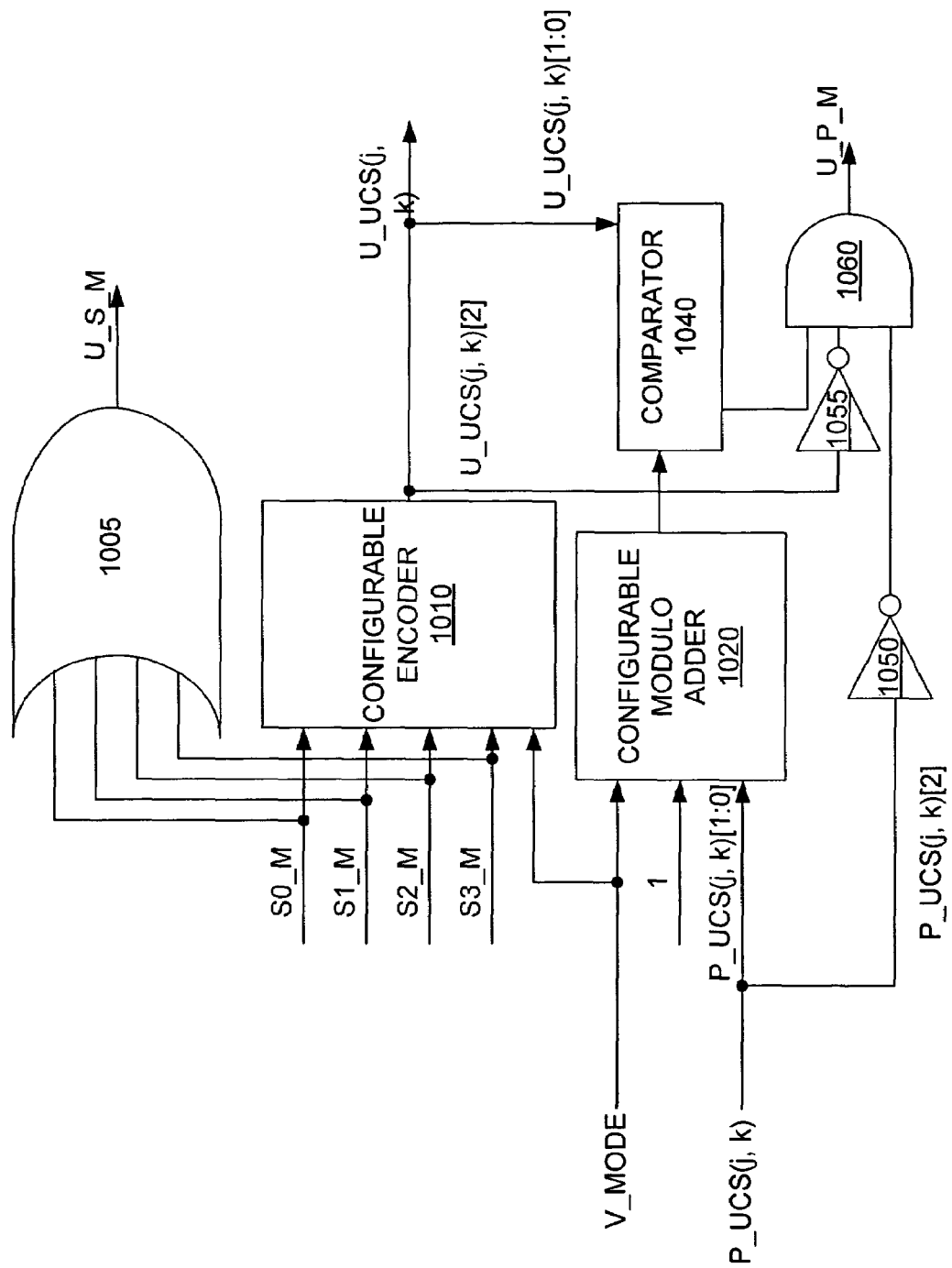
FIG. 10 is a simplified block diagram of another portion of a U chrominance sub-pattern detection unit in accordance with one embodiment of the present invention.

FIG. 10 is a block diagram of a configurable version of the portion of U chrominance sub-pattern detection unit 410 that generates U chrominance sub-pattern match signal U_S_M, U chrominance pattern match signal U_P_M, and updated U chrominance sub-pattern value U_UCS(j, k). The embodiment of FIG. 10, which can be used for either PAL video signals or NTSC video signals, is controlled by a video mode signal V_MODE, which can be at a NTSC logic level (e.g., logic high) or a PAL logic level (e.g., logic low). A four-input OR gate 1005 receives sub-pattern match signal S0_M, S1_M, S2_M, and S3_M and generates U chrominance sub-pattern match signal U_S_M. A configurable encoder 1010, which also receives sub-pattern match signal S0_M, S1_M, S2_M, and S3_M and video mode signal V_MODE, generates updated U chrominance sub-pattern value U_UCS(j, k). When video mode signal V_MODE is at the PAL logic level, configurable encoder 1010 uses the truth table shown in Table 2 (above). However, when video mode signal V_MODE is at the NTSC logic level, configurable encoder 1010 uses the truth table shown in Table 4 (below). Because only two NTSC color-crossing sub-patterns are used, sub-pattern match signals S2_M and S3_M are not used in NTSC mode. Therefore, in Table 4 an "X" denoting "Don't Care" is shown under sub-pattern match signal S2_M and S3_M. However, in the specific implementation of FIG. 10, sub-pattern match signals S2_M and S3_M are driven to logic low in NTSC mode so that four-input OR gate 1005 functions properly in NTSC mode. Any combination of sub-pattern match signals that does not appear in table 4 is an error condition, but updated U chrominance sub-pattern value U_UCS(j, k) would still take on the reserved value of 4.

TABLE 4

| S0_M | S1_M | S2_M | S3_M | U_UCS(j, k) |
|---|---|---|---|---|
| 1 | 0 | X | X | 0 |
| 0 | 1 | X | X | 1 |
| 0 | 0 | X | X | 4 |

A configurable modulo adder 1020 performs addition with 1 and the two lower order bits of previous U chrominance sub-pattern value P_USC(j, k). When video mode signal V_MODE is at the PAL logic level, configurable modulo adder 1020 performs modulo 4 addition. However, when video mode signal V_MODE is at the NTSC logic level, configurable adder 1020 performs modulo 2 addition.

The output of configurable modulo adder 1020 indicates what value updated U chrominance sub-pattern value U_UCS (j, k) should be. Therefore, comparator 1040 determines whether the output of configurable modulo adder 1020 is equal to the two lower order bits of updated chrominance sub-pattern value U_UCS(j, k) from encoder 1010 and provides the result of the comparison to an input terminal of an AND gate 1060. The high order bit (i.e. bit 2) of updated U chrominance sub-pattern value U_UCS(j, k), i.e. U_UCS(j, k)[2], is applied to the input terminal of an inverter 1055, which has an output terminal coupled to a second input terminal of AND gate 1060. Similarly, the high order bit (i.e., bit 2) of previous U chrominance sub-pattern value P_UCS(j, k), i.e. P_UCS(j, k)[2]) is applied to the input terminal of an inverter 1050, which has an output terminal coupled to a third input terminal of AND gate 1060. AND gate 1060 provides U chrominance pattern match signal U_P_M. When previous U chrominance sub-pattern value P_UCS(j, k) is equal to the reserved value (indicating that the previous set of pixels did not match any of the sub-patterns) the upper order bit previous U chrominance sub-pattern value P_UCS(j, k) is at logic high. Therefore, providing the upper order bit through inverter 1050 to an input terminal of AND gate 1060 causes AND gate 1060 to drive U chrominance pattern match signal U_P_M to the unmatched logic level (i.e., logic low). Similarly, when updated U chrominance sub-pattern value U_UCS(j, k) is equal to the reserved state, AND gate 1060 drives U chrominance pattern match signal U_P_M to the unmatched logic level (i.e., logic low). When neither previous U chrominance sub-pattern value P_UCS(j, k) nor updated U chrominance sub-pattern value U_UCS(j, k) are equal to the reserved state, AND gate 1060 drives U chrominance pattern match signal U_P_M to the match logic level (i.e. logic high) when the two lower bits of the updated U chrominance sub-pattern value, i.e. U_UCS(j, k)[1:0], is equal to the two lower bits of the previous U chrominance sub-pattern value, i.e. P_UCS(j, k)[1:0], plus one modulo 4 in PAL mode or modulo 2 in NTSC mode.

Several different techniques can be used for color error suppression for NTSC video signals. For example, the averaging technique of equations EQ1(a) and EQ1(b) is used for NTSC video signals to calculate updated U chrominance value U_U(i, j, k) and updated V chrominance value U_V(i, j, k), respectively.

However, due to the differences in the color-crossing pattern between PAL and NTSC video signals, some of the suppression techniques described above should be modified for NTSC video signals. Specifically, equations EQ2(a) and EQ2(b) should not be used with NTSC video signals because U(i, j, k) and U(i+4, j, k) would not include both a "Large" and a "Small" chrominance value. Therefore, for NTSC video signals U(i+2, j, k) should be used in place of U(i+4, j, k). Similarly V(i+2, j, k) should be used in place of V(i+4, j, k). Equations EQ2N(a) and EQ2N(b) provides alternate formulas for calculating updated U chrominance value U_U(i, j, k) and updated V chrominance value U_V(i, j, k), respectively, for NTSC video signals.

$$U\_U(i,j,k)=[U(i,j,k)+U(i+2,j,k)]/2 \qquad \text{EQ2N(a)}$$

$$U\_V(i,j,k)=[V(i,j,k)+V(i+2,j,k)]/2 \qquad \text{EQ2N(b)}$$

Similarly, Equations EQ3(a) and EQ3(b) should not be used for NTSC video signals. However Equations EQ4(a) and EQ4(b) are well suited for NTSC video signals.

Just as for PAL video signals, some embodiments of the present invention for NTSC video signals only use averaging techniques for color crossing error suppression. For example, in one embodiment of the present invention the averaging technique of equations EQ1(a) and EQ1(b) is used for NTSC video signals to calculate updated U chrominance value U_U (i, j, k) and updated V chrominance value U_V(i, j, k), respectively. In a low cost embodiment the averaging technique of equations EQ2N(a) and EQ2N(b) is used for NTSC video signals to calculate updated U chrominance value U_U(i, j, k) and updated V chrominance value U_V(i, j, k), respectively.

Similarly, just as for PAL video signals, some embodiments of the present invention for NTSC video signals only use an iterative approach to calculate updated U chrominance values U_U(i, j, k) using a combination of previous U chrominance values from previous fields with U chrominance values from current and/or subsequent fields. For example in one embodiment of the present invention, updated U chrominance value U_U(i, j, k) is set equal to a weighted average of U chrominance values U(i, j, k) and U(i−2, j, k). For NTSC video signals, U chrominance value U(i−2, j, k) is used with U chrominance value U(i, j, k) because one of the two U chrominance values is "Large" and the other one is "Small" when color-crossing error exists at current pixel P(i, j, k). Similarly, updated V chrominance value U_V(i, j, k) is set to a weighted average of V chrominance values V(i, j, k) and V(i−2, j, k). Equations EQ4(a) and EQ4(b) (described above) provides the formula for calculating updated U chrominance value U_U(i, j, k) and updated V chrominance value U_V(i, j, k), respectively.

Still other embodiments the present invention for NTSC video signals combine multiple suppression techniques. For example, in one embodiment of the present invention which stores previous field F(i−2) in video buffer 210, color-crossing error suppression unit 250 combines an averaging suppression technique, with an iterative suppression technique. Specifically, when count value E_CNT(j, k) is greater than or equal to initial color-crossing threshold I_C_C_T and less than final color-crossing threshold F_C_C_T, color-crossing error suppression unit 250 calculates updated chrominance values using the averaging technique of equations EQ1 (a) and EQ1 (b). Then, when count value E_CNT(j, k) is greater than or equal to final color-crossing threshold F_C_C_T, color-crossing error suppression unit 250 calculates updated chrominance values using the iterative technique of equations EQ4 (a) and EQ4 (b), with a relatively small value for weighting factor q, such as 0.375. In another embodiment of the present invention the averaging technique of equations EQ2N (a) and EQ2N(b) are used instead of the averaging technique of equations EQ1 (a) and EQ1(b). Usually using equations EQ1(a) and EQ1(b) provides better color-crossing suppression than using EQ2N(a) and EQ2N(b).

In another embodiments of the present invention for NTSC video signals, which stores previous field F(i−2) in video buffer 210, color-crossing error suppression unit 250 uses two iterative suppression techniques. Specifically, when count value E_CNT(j, k) is greater than or equal to initial color-crossing threshold I_C_C_T and less than final color-crossing threshold F_C_C_T, color-crossing error suppression unit 250 calculates updated chrominance values using the iterative technique of equations EQ4 (a) and EQ4 (b), with a relatively large value for weighting factor q, such as 0.625. Then, when count value E_CNT(j, k) is greater than or equal to final color-crossing threshold F_C_C_T, color-crossing error suppression unit 250 calculates updated chrominance values using the iterative technique of equations EQ4 (a) and EQ4 (b), with a relatively small value for weighting factor q, such as 0.375.

When color-crossing error exists at the current pixel position P(i,j,k) in NTSC video signals, U chrominance signal U(i−4, j, k) and U chrominance signal U(i, j, k) would not include a "Large" and a "Small" value. Therefore, even in embodiments of the present invention, which stores previous field F(i−4) in video buffer 210, color-crossing error suppression unit 250 would use the techniques described above for embodiments of the present invention that only store field F(i−2) in video buffer 210.

In the various embodiments of the present invention, novel structures and methods have been described for detecting and suppressing color-crossing error. The various embodiments of the structures and methods of this invention that are described above are illustrative only of the principles of this invention and are not intended to limit the scope of the invention to the particular embodiments described. For example, in view of this disclosure those skilled in the art can define other color-crossing error detection units, color-crossing error suppression units, video buffers, chrominance sub-patterns, chrominance sub-pattern detection units, encoders, and so forth, and use these alternative features to create a method, circuit, or system according to the principles of this invention. Thus, the invention is limited only by the following claims.

What is claimed is:

1. A method of suppressing color-crossing error in decoded video signals representing a plurality of fields, the method comprising:
   determining a count value with a color-crossing error suppression unit based on chrominance values;
   using a first suppression technique with the color-crossing error suppression unit at a pixel location for a first subset of fields exhibiting color-crossing error at the pixel location, when the count value is greater than an initial threshold;
   using a second suppression technique with the color crossing error suppression unit at the pixel location for a second subset of fields exhibiting color-crossing error at the pixel location, when the count value is greater than a final threshold, wherein the second subset of fields follows the first subset of fields in the video signal.

2. The method of claim 1, wherein the first suppression technique is an averaging technique and the second suppression technique is an iterative technique.

3. The method of claim 1, wherein the first suppression technique is an iterative technique using a large weighting factor and the second suppression technique is an iterative technique with a small weighting factor.

4. The method of claim 1, wherein the first suppression technique further comprises:
   calculating an updated U chrominance value for a current pixel of a current field by averaging U chrominance values from a set of corresponding pixels; and
   calculating an updated V chrominance value for the current pixel by averaging V chrominance values from the set of corresponding pixels.

5. The method of claim 4, wherein the set of corresponding pixels includes the current pixel and a corresponding pixel from each of three fields of the same field type as the current field following the current field.

6. The method of claim 4, wherein the decoded video signals are PAL video signals, the current field is field F(i), and the set of corresponding pixels includes the current pixel and the corresponding pixel from field F(i+4).

7. The method of claim 4, wherein the decoded video signals are NTSC video signals, the current field is field F(i), and the set of corresponding pixels includes the current pixel and the corresponding pixel from field F(i+2).

8. The method of claim 1, wherein the second suppression technique further comprises:
   calculating an updated U chrominance for a current pixel, wherein the updated U chrominance value is equal to a weighted average of a U chrominance value of the current pixel with a U chrominance value of a corresponding pixel from a previous field; and
   calculating an updated V chrominance for the current pixel, wherein the updated V chrominance value is equal to a weighted average of a V chrominance value of the current pixel with a V chrominance value of the corresponding pixel from the previous field.

9. The method of claim 8, wherein the decoded video signals are NTSC video signals, the current field is field F(i), and the previous field is field E'(i−2).

10. The method of claim 8, wherein the decoded video signals are PAL video signals, the current field is field F(i), and the previous field is field F(i−4).

11. The method of claim 8, wherein the decoded video signals are PAL video signals, the current field is field F(i), and the previous field is field F(i−2).

12. A color-crossing error suppression system, for processing a decoded video signals representing a plurality of fields, comprising:
  means for determining a count value based on chrominance values;
  means for using a first suppression technique at a pixel location for a first subset of fields exhibiting color-crossing error at the pixel location, when the count value is greater than an initial threshold;
  means for using a second suppression technique at the pixel location for a second subset of fields exhibiting color-crossing error at the pixel location, when the count value is greater than a final threshold, wherein the second subset of fields follows the first subset of fields in the video signal.

13. The color-crossing error suppression system of claim 12, wherein the first suppression technique is an averaging technique and the second suppression technique is an iterative technique.

14. The color-crossing error suppression system of claim 12, wherein the first suppression technique is an iterative technique using a large weighting factor and the second suppression technique is an iterative technique with a small weighting factor.

15. The color-crossing error suppression system of claim 12, wherein the first suppression technique further comprises:
  means for calculating an updated U chrominance value for a current pixel of a current field by averaging U chrominance values from a set of corresponding pixels; and
  means for calculating an updated V chrominance value for the current pixel by averaging V chrominance values from the set of corresponding pixels.

16. The color-crossing error suppression system of claim 15, wherein the set of corresponding pixels includes the current pixel and a corresponding pixel from each of three fields of the same field type as the current field following the current field.

17. The color-crossing error suppression system of claim 15, wherein the decoded video signals are PAL video signals, the current field is field F(i), and the set of corresponding pixels includes the current pixel and the corresponding pixel from field F'(i+4).

18. The color-crossing error suppression system of claim 15, wherein the decoded video signals are NTSC video signals, the current field is field E(i), and the set of corresponding pixels includes the current pixel and the corresponding pixel from field F(i+2).

19. The color-crossing error suppression system of claim 12, wherein the second suppression technique further comprises:
  means for calculating an updated U chrominance for a current pixel, wherein the updated U chrominance value is equal to a weighted average of a U chrominance value of the current pixel with a U chrominance value of a corresponding pixel from a previous field; and
  means for calculating an updated V chrominance for the current pixel, wherein the updated V chrominance value is equal to a weighted average of a V chrominance value of the current pixel with a V chrominance value of the corresponding pixel from the previous field.

20. The color-crossing error suppression system of claim 19, wherein the decoded video signals are NTSC video signals, the current field is field F(i), and the previous field is field F(i−2).

21. The color-crossing error suppression system of claim 19, wherein the decoded video signals are PAL video signals, the current field is field F'(i), and the previous field is field F(i−4).

22. The color-crossing error suppression system of claim 19, wherein the decoded video signals are PAL video signals, the current field is field F(i), and the previous field is field F(i−2).

* * * * *

UNITED STATES PATENT AND TRADEMARK OFFICE
CERTIFICATE OF CORRECTION

PATENT NO. : 7,697,075 B2
APPLICATION NO. : 11/046591
DATED : April 13, 2010
INVENTOR(S) : Ge Zhu It is certified that error appears in the above-identified patent and that said Letters Patent is hereby corrected as shown below:

Column 19

Line 3, please delete "is field E'(i-2)" and substitute --is field F(i-2)--;

Column 20

Line 13, please delete "field E(i)" and substitute --field F(i)--.

Signed and Sealed this

Sixth Day of July, 2010

David J. Kappos
*Director of the United States Patent and Trademark Office*